United States Patent
Fu

(10) Patent No.: US 12,452,919 B2
(45) Date of Patent: Oct. 21, 2025

(54) DATA TRANSMISSION METHOD AND APPARATUS, AND ELECTRONIC DEVICE

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 289 days.

(21) Appl. No.: 18/196,976

(22) Filed: May 12, 2023

(65) Prior Publication Data

US 2023/0284270 A1 Sep. 7, 2023

Related U.S. Application Data

(63) Continuation-in-part of application No. PCT/CN2020/128803, filed on Nov. 13, 2020.

(51) Int. Cl.
*H04W 74/0808* (2024.01)

(52) U.S. Cl.
CPC .............. *H04W 74/0808* (2013.01)

(58) Field of Classification Search
None
See application file for complete search history.

(56) References Cited

U.S. PATENT DOCUMENTS

| | | | |
|---|---|---|---|
| 2019/0150193 A1 | 5/2019 | Harada et al. | |
| 2020/0008238 A1 | 1/2020 | Huang et al. | |
| 2020/0187250 A1 | 6/2020 | Bhattad et al. | |
| 2020/0245356 A1 | 7/2020 | Tomeba et al. | |
| 2024/0322983 A1* | 9/2024 | Ijaz | H04W 74/0808 |

FOREIGN PATENT DOCUMENTS

| | | | |
|---|---|---|---|
| CN | 108574953 A | 9/2018 |
| CN | 109156031 A | 1/2019 |
| CN | 110505026 A | 11/2019 |
| CN | 110831225 A | 2/2020 |

(Continued)

OTHER PUBLICATIONS

Combined Chinese Office Action and Search Report issued Dec. 13, 2024, in corresponding Chinese Patent Application No. 202080003297.0 (with English Translation and English Translation of Category of Cited Documents), 11 pages.

(Continued)

*Primary Examiner* — Walter J Divito
(74) *Attorney, Agent, or Firm* — Oblon, McClelland, Maier &Neustadt, L.L.P.

(57) ABSTRACT

The present disclosure relates to the technical field of wireless communication, and provides data transmission methods and apparatuses, and electronic devices. The method is applicable in a no-Listen-Before-Talk (no-LBT) channel access scene over an unlicensed frequency band, and includes: in response to a Channel Occupy Time for a currently occupied first channel reaching a Maximum Channel Occupy Time (MCOT) of the first channel, releasing the first channel; in response to a data transmission instruction, obtaining a first gap between an estimated start moment of a data transmission and a release moment for the first channel; and in response to the first gap reaching a first predetermined time length, occupying a second channel for the data transmission.

20 Claims, 4 Drawing Sheets

(56) References Cited

FOREIGN PATENT DOCUMENTS

| CN | 110972324 A | 4/2020 |
|---|---|---|
| CN | 111182635 A | 5/2020 |
| JP | 2004-173099 A | 6/2004 |

OTHER PUBLICATIONS

Written Opinion of the International Searching Authority Issued Aug. 12, 2021, in PCT/CN2020/128803, (with English Translation), 6 pages.
Moderator (Qualcomm Incorporated), "FL summary for channel access mechanism for 52.6GHz-71GHz band", R1-20xxxxx, 3GPP TSG RAN WG1 Meeting #103-e, Oct. 26-Nov. 13, 2020, 69 pages.
Qualcomm Incorporated, "Channel access procedures for NR unlicensed", R1-1909245, 3GPP TSG RAN WG1 Meeting #98, Prague, CZ, Aug. 26-Aug. 30, 2019, 18 pages.
ISA State Intellectual Property Office of the People's Republic of China, International Search Report Issued in Application No. PCT/CN2020/128803, Aug. 12, 2021, WIPO, 4 pages.
Moderator (Qualcomm Incorporated), "FL summary for channel access mechanism for 52.6GHz-71GHz band", 3GPP TSG RAN WG1 Meeting #103-e R1-2009408, Nov. 1, 2020, 73 pages.
Office Action mailed Jun. 30, 2025, in Chinese Application No. 202080003297.0 filed Nov. 13, 2020 (citing document No. 24 therein).
Qualcomm Incorporated, "Channel access procedures for NR unlicensed", R1-1904999, 3GPP TSG RAN WG1 Meeting #96Bis, Xian, China, Apr. 8-Apr. 12, 2019, 17 pages.

\* cited by examiner

DATA TRANSMISSION METHOD AND APPARATUS, AND ELECTRONIC DEVICE

CROSS-REFERENCE TO RELATED APPLICATIONS

The present application is a continuation-in-part of International Application No. PCT/CN2020/128803, filed on Nov. 13, 2020, which is incorporated herein by reference in its entirety.

BACKGROUND

For data transmission over an unlicensed frequency band, a channel access mechanism of Listen Before Talk (LBT) over the unlicensed frequency band is usually used. While in a high-frequency range, a channel access mechanism of no-LBT is often used for data transmission due to the large attenuation in high-frequency channels. In this case, it is very likely that a transmitter almost continuously occupies a channel. This inevitably results in a single node occupying the channel near continuously, thereby causing sustained interference and other effects on other neighboring nodes.

SUMMARY

The present disclosure relates to the field of wireless communication, in particular to data transmission methods and apparatuses, and electronic devices.

Embodiments of a first aspect of the present disclosure provide a data transmission method, which is applicable in a no-Listen-Before-Talk (no-LBT) channel access scene over an unlicensed frequency band. The method includes releasing a first channel in response to a Channel Occupy Time (COT) for a currently occupied first channel reaching a Maximum Channel Occupy Time (MCOT) of the first channel; obtaining, in response to a data transmission instruction, a first gap between an estimated start moment of a data transmission and a release moment for the first channel; and occupying, in response to the first gap reaching a first predetermined time length, a second channel for the data transmission.

Embodiments of a second aspect of the present disclosure provide a data transmission apparatus, which is applicable in a no-Listen-Before-Talk (no-LBT) channel access scene over an unlicensed frequency band. The apparatus includes:
a releasing module, configured to release a first channel in response to a Channel Occupy Time (COT) for a currently occupied first channel reaching a Maximum Channel Occupy Time (MCOT) of the first channel;
a first obtaining module, configured to obtain, in response to a data transmission instruction, a first gap between an estimated start moment of a data transmission and a release moment for the first channel; and
a first transmitting module, configured to occupy, in response to the first gap reaching a first predetermined time length, a second channel for the data transmission.

Embodiments of a third aspect of the present disclosure provide an electronic device, including:
at least one processor; and
a memory for storing instructions by the at least one processor,
wherein the processor is configured to perform the data transmission methods described in the embodiments of the first aspect of the present disclosure.

Embodiments of a fourth aspect of the present disclosure provide a non-transitory computer-readable storage medium storing instructions that, when executed by one or more processors of a device, cause the device to perform the data transmission methods described in the embodiments of the first aspect of the present disclosure.

Additional aspects and advantages of the present disclosure will be given in part in the following description, which will become apparent from the following description, or will be learned through the practice of the present disclosure.

BRIEF DESCRIPTION OF THE DRAWINGS

The above-mentioned and/or additional aspects and advantages of the present disclosure will become apparent and readily understood from the following description of embodiments in conjunction with the accompanying drawings.

DETAILED DESCRIPTION OF THE EMBODIMENTS

Embodiments of the present disclosure are described in detail below, and examples of the embodiments are shown in the accompanying drawings, where the same or similar reference numbers indicate identical or similar components or components having identical or similar functions from the beginning to the end. The embodiments described below with reference to the accompanying drawings are exemplary and are intended to be used to explain the present disclosure, but cannot be understood as a limitation to the present disclosure.

Figure 1:
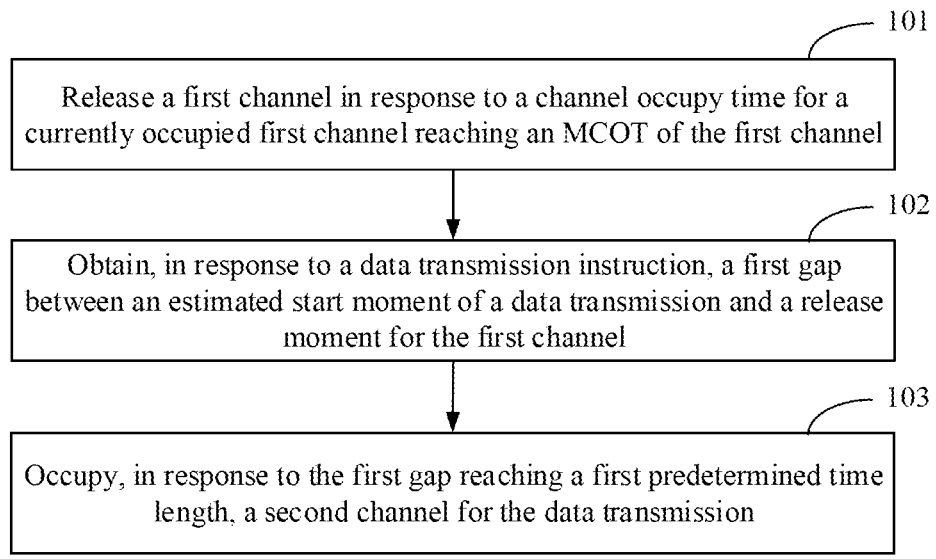
FIG. 1 is a schematic flowchart of a data transmission method provided by embodiments of the present disclosure.

FIG. 1 is a schematic flowchart of a data transmission method provided by the embodiments of the present disclosure, which can be applied in an access channel scene for an unlicensed frequency band where no-Listen Before Talk (LBT) is adopted. As shown in FIG. 1, the data transmission method can include steps 101-103.

At step 101, in response to a Channel Occupy Time (COT) for a currently occupied first channel reaching a Maximum Channel Occupy Time (MCOT) of the first channel, the first channel is released.

It should be noted that, prior to occupying a channel to transmit data over an unlicensed frequency band, a transmitter usually is to listen to the channel first, that is, to perform Clear Channel Assessment (CCA). When the transmitter performs the CCA, in a case that the channel is identified as idle, the channel can be occupied to transmit the data. An MCOT of the occupied channel can be stipulated in an agreement or configured/indicated by a base station. In a case that the channel is identified as not idle, the channel cannot be occupied. The above-mentioned process is generally called a channel access mechanism of LBT over an unlicensed frequency band.

In related arts, for a scene where channel access is performed with LBT for an unlicensed frequency band, that is, in a case of using LBT, if a gap (time interval) between two data transmissions by a transmitter is smaller than a predetermined time length, the above-mentioned two data transmissions can be taken as belonging to the same transmission, and thus can share a same COT. The predetermined time length may be 16 us (microsecond), 25 us and so on. In addition, when the transmitter occupies a channel for the MCOT, the transmitter is to end the transmission.

For example, an MCOT set for a transmitter can be 6 ms (milliseconds). When the transmitter starts to occupy a channel, the transmitter transmits data continuously for 4 ms and suspends transmitting, where a time length of a gap for the suspension is represented as T. Further, the transmitter starts to perform a next transmission. In this case, if T is smaller than or equal to 16 us, this transmission and a transmission before the suspension can be taken as the same transmission. The transmitter can directly start transmitting without performing LBT. A maximum time length for this transmission can be 2 ms−T, that is to say, these two transmissions share the same channel occupy time. If T is greater than 16 us, this transmission can be taken as different transmissions from the transmission before the suspension, be taken as a new transmission, and LBT is to be performed again.

For a high-frequency range, due to larger attenuation in high-frequency channels, transmitters may interfere less with each other even if the transmitters are close to each other. In this case, a no-LBT channel access mechanism is usually adopted. In other words, while performing data transmission within the high-frequency range, a transmitter can directly transmit data without performing LBT before transmitting the data. In the embodiments of the present disclosure, the high-frequency range may range from 52.6 GHz to 71 GHz.

However, for a no-LBT channel access scene (that is, the no-LBT channel access mechanism is adopted) for an unlicensed frequency band, it is very easy for a transmitter to occupy a channel almost continuously. In this way, a single node may occupy a channel almost continuously, thereby inducing continuous interference and other effects on other neighboring node(s). In addition, when a transmitter occupies a channel for an MCOT, the transmitter is to finish the transmission. However, due to the adoption of the no-LBT mechanism, the transmitter can immediately start the next transmission, which also leads to the transmitter always occupying the channel.

For example, if a transmission gap of 16 us is used, a transmitter merely needs to interrupt a transmission for more than 16 us (e.g., it is about a time length of 2 slots for a 120 kHz subcarrier) before an MCOT ends, and then reoccupies the channel for another MCOT.

Therefore, to address the above-mentioned problem, the present disclosure can release the first channel when the MCOT is over, that is, when a COT for the currently occupied first channel reaches an MCOT of the first channel.

At step 102, in response to a data transmission instruction, a first gap between an estimated start moment of a data transmission and a release moment for the first channel is obtained.

The first gap can refer to a gap between two adjacent transmissions.

For example, in response to obtaining the data transmission instruction, a first gap between an estimated moment of starting a data transmission and a moment of releasing the first channel can be obtained and marked as $\Delta t_1$.

At step 103, in response to the first gap reaching a first predetermined time length, a second channel is occupied for the data transmission.

In the embodiments of the present disclosure, when it is ensured that the first gap between two adjacent transmissions (for example, a completed data transmission and a new data transmission to be performed next) reaches the first predetermined time length, the second channel can be occupied for the new data transmission.

The first predetermined time length can be set according to the actual situations. For example, the first predetermined time length $T_1$ may be set as a value bound to the MCOT of the first channel, or the first predetermined time length $T_1$ may be set as a fixed value. The second channel may be the first channel, or a channel other than the first channel.

In the data transmission method provided by the present disclosure, for a no-LBT channel access scene over an unlicensed frequency band, a first channel can be released in response to a COT for a currently occupied first channel reaching an MCOT of the first channel, a first gap between an estimated start moment of a data transmission and a release moment for the first channel can be obtained in response to a data transmission instruction, and a second channel can be occupied for the data transmission in response to the first gap reaching a first predetermined time length. In this way, a problem of a transmitter almost continuously occupying a channel can be alleviated, which ensures not causing continuous interference and other effects on other neighboring nodes, thereby improving the quality of data transmission as well as the reliability and effectiveness of the data transmission process.

Further, in the embodiments of the present disclosure, when the first gap between the estimated start moment of data transmission and the release moment for the first channel is obtained in response to the data transmission instruction, in response to the first gap not reaching the first predetermined time length, no data transmission is initiated.

It should be noted that, in the embodiments of the present disclosure, optionally, the first predetermined time length may be a value bound to the MCOT of the first channel, for example, the first predetermined time length $T_1$ may be set to a value positively correlated with the MCOT of the first channel. In this case, the larger the MCOT, the larger a value of the first predetermined time length $T_1$. In some examples, the first predetermined time length $T_1$ may be set to a fixed value, such as 6 ms, 8 ms or the like.

In a possible implementation, the first predetermined time length may be set to a value positively correlated with the MCOT of the first channel. In this case, in response to determining that the first gap reaches the first predetermined time length, for example, $\Delta t_1 \geq T_1$, a second channel can be occupied for a data transmission. In response to determining that the first gap does not reach the first predetermined time length, for example, $\Delta t_1 < T_1$, no data transmission can be initiated.

In another possible implementation, the first predetermined time length may be set to 6 ms. In this case, in response to determining that the first gap reaches the first predetermined time length, for example, $\Delta t_1$ is 8 ins, a second channel can be occupied for a data transmission. In response to determining that the first gap does not reach the first predetermined time length, for example, $\Delta t_1$ is 4 ms, no data transmission can be initiated.

In the data transmission methods provided by the present disclosure, when the first gap between the estimated start moment of data transmission and the release moment for the first channel is obtained in response to the data transmission instruction, no data transmission can be initiated in response to the first gap not reaching the first predetermined time length. In this way, it is possible to reduce continuous channel occupation by the transmitter due to the transmitter immediately starting the next transmission with the adoption of the no-LBT mechanism, which further improves the quality of data transmission as well as the reliability and availability of data transmission.

It should be noted that the above-mentioned process is described for a case of trying to occupy a channel again when an MCOT is ended. For a case that the MCOT is not ended, a data transmission process thereof is explained and described below.

It should be noted that when the MCOT is not ended, to prevent a transmitter from continuously occupying a channel caused by the transmitter being able to start the next transmission immediately with usage of the no-LBT mechanism, in the present disclosure, a second gap between a current data transmission and a previous data transmission within the MCOT of the occupied channel can be obtained, and a matched channel occupation strategy can be determined according to the second gap.

Figure 2:
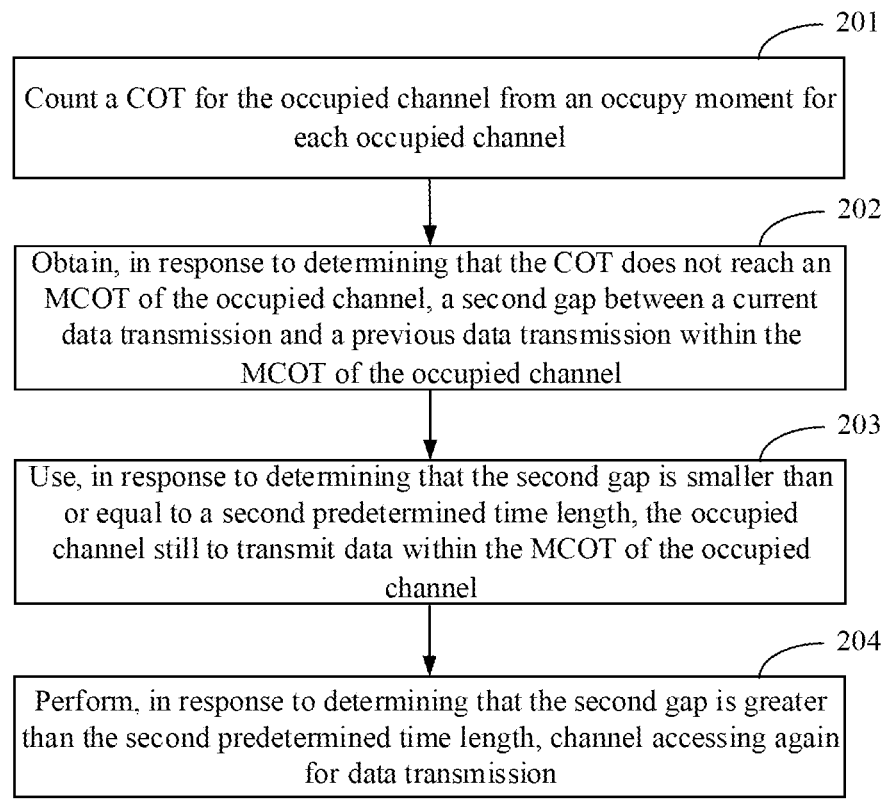
FIG. 2 is a schematic flowchart of another data transmission method provided by the embodiments of the present disclosure.

In a possible implementation, as shown in FIG. 2, the following steps are included.

At step 201, a COT for the occupied channel is counted from an occupy moment for each occupied channel.

For example, for each occupied channel, starting from the occupy moment for the occupied channel, the COT for the occupied channel can be timed and marked as t.

At step 202, in response to determining that the COT does not reach an MCOT of the occupied channel, a second gap between a current data transmission and a previous data transmission within the MCOT of the occupied channel is obtained.

In the embodiments of the present disclosure, in response to determining that the COT does not reach the MCOT of the occupied channel (indicating that the MCOT is not ended), the second gap between the current data transmission and the previous data transmission, which are both within the MCOT of the occupied channel, can be obtained.

For example, in response to determining that the counted time does not reach the MCOT of the occupied channel, the second gap between an estimated start moment of the current data transmission and an end time of the previous data transmission in the MCOT of the occupied channel can be obtained and marked as $\Delta t_2$.

At step 203, in response to determining that the second gap is smaller than or equal to a second predetermined time length, the occupied channel is still used to transmit data within the MCOT of the occupied channel.

In a case that the second gap is smaller than or equal to the second predetermined time length, the current data transmission and the previous data transmission can be taken as the same transmission, and thus the same MCOT can be shared. Therefore, data can be transmitted using the occupied channel still within the MCOT of the occupied channel.

At step 204, in response to determining that the second gap is greater than the second predetermined time length, channel accessing is performed again for data transmission.

In one implementation, in a case that the second gap is greater than the second predetermined time length, the current data transmission can be taken as different transmissions from the previous data transmission, be taken as a new transmission. Further, a channel occupied by the previous data transmission (e.g., a first channel) is to be released, and a channel (e.g., a second channel) is to be occupied for the current data transmission.

In another implementation, in a case that the second gap is greater than the second predetermined time length, whether the second gap is greater than the first predetermined time length can be further determined. In response to determining that the second gap is greater than or equal to the first predetermined time length, channel accessing is performed again for the current data transmission. In response to determining that the second gap is smaller than the first predetermined time length, no data transmission is initiated.

It should be noted that in the embodiments of the present disclosure, optionally, the second predetermined time length may be a value greater than a default value and bound to the MCOT of the occupied channel. For example, if the default value is 16 us, the second predetermined time length $T_2$ can be set to a value greater than 16 us and positively correlated with the MCOT of the occupied channel. In this case, the larger the MCOT, the larger the value of the second predetermined time length $T_2$. In some examples, the second predetermined time length $T_2$ may be set to a fixed value, for example, 1 ms.

In a possible implementation, the second predetermined time length may be set to a value greater than the default value and positively correlated with the MCOT of the occupied channel. In this case, in response to determining that the second gap is less than or equal to the second predetermined time length, for example, $\Delta t_2 \leq T_2$, the occupied channel can still be used to transmit data within the MCOT of the occupied channel. In response to determining that the second gap is greater than the second predetermined time length, for example $\Delta t_2 \geq T_2$, channel accessing can be performed again for data transmission.

In another possible implementation, the second predetermined time length may be set to 0.5 ms. In this case, in response to determining that the second gap is smaller than or equal to the second predetermined time length, for example, $\Delta t_2$ is 8 us, the occupied channel can still be used to transmit data within the MCOT of the occupied channel. In response to determining that the second gap is greater than the second predetermined time length, for example, $\Delta t_2$ is 0.7 ins, channel accessing can be performed again for data transmission.

In the data transmission methods provided by the present disclosure, for a no-LBT channel access scene over an unlicensed frequency band, optionally, when the MCOT not ends, the second gap between the current data transmission and the previous data transmission (which are both within the MCOT of the occupied channel) can be obtained, and a matched channel occupancy strategy can be determined according to the second gap. In this way, the transmitter using the no-LBT mechanism is prevented from starting the next transmission immediately and occupying the channel continuously.

Figure 3:
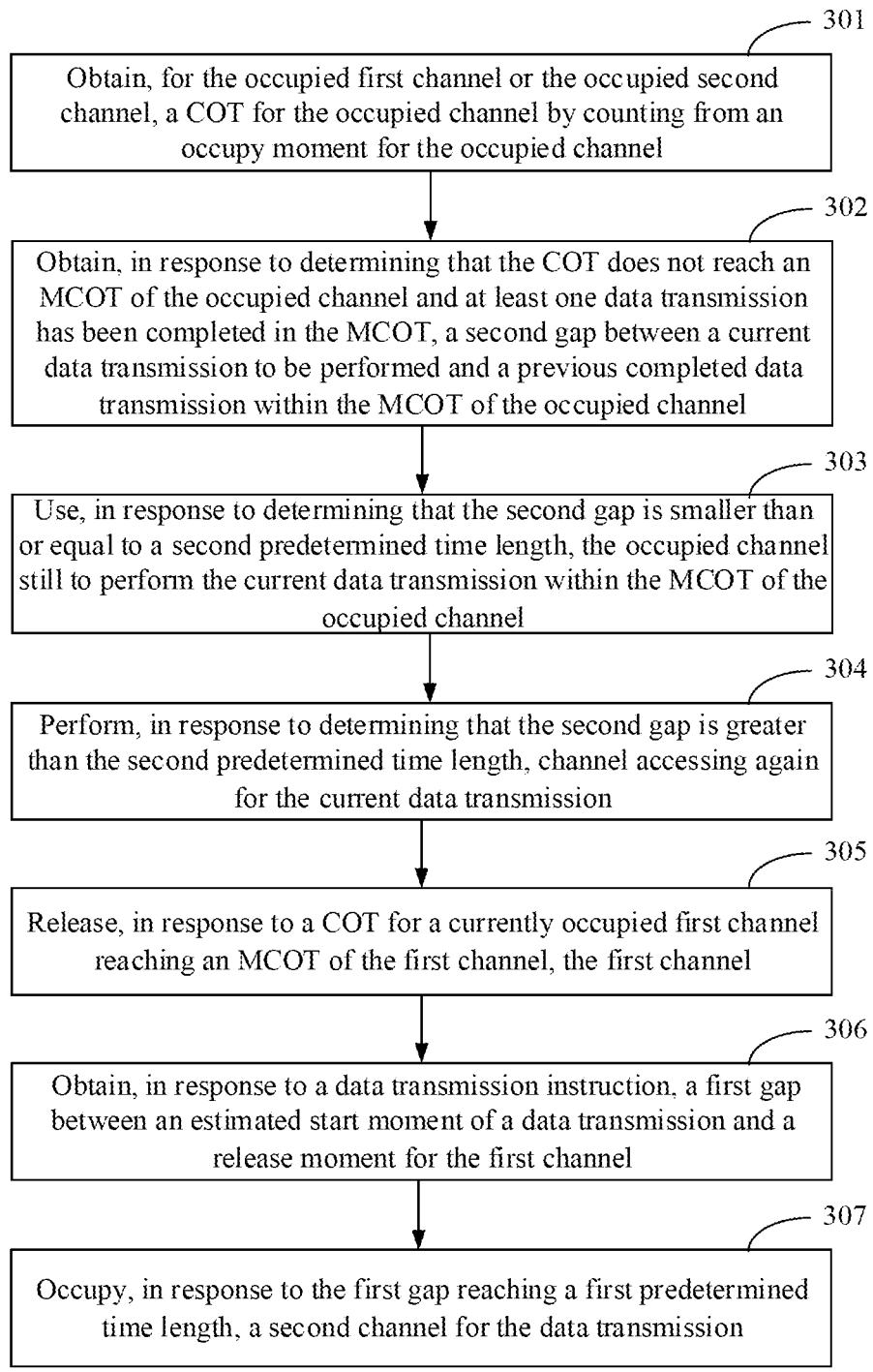
FIG. 3 is a schematic flowchart of another data transmission method provided by the embodiments of the present disclosure.

FIG. 3 illustrates a data transmission method provided by another embodiment of the present application, as shown in FIG. 3, which specifically includes the following steps 301 to 307.

At step 301, for the occupied first channel or the occupied second channel, a COT for the occupied channel is obtained by counting from an occupy moment for the occupied channel.

For example, for the occupied first channel, starting from a moment of occupying the first channel, a COT for occupying the first channel is counted and marked as $t_1$. For another example, for the occupied second channel, starting from a moment of occupying the second channel, a COT for occupying the second channel is counted and marked as $t_2$.

At step 302, in response to determining that the COT does not reach an MCOT of the occupied channel and at least one data transmission has been completed in the MCOT, a second gap between a current data transmission to be performed and a previous completed data transmission within the MCOT of the occupied channel is obtained.

In the embodiments of the present disclosure, in response to determining that a counted time (e.g., $t_1$ or $t_2$) does not reach the MCOT of the occupied channel, in other words, in response to that the MCOT is not ended yet and an old data transmission has been completed in the MCOT, while a new data transmission is to occupy the MCOT, the second gap between the new data transmission (which is referred to as the current data transmission as well) and adjacent old data transmission (which is referred to as the previous completed data transmission as well), which are both within the MCOT of the occupied channel, can be obtained.

For example, in response to determining that the COT does not reach the MCOT of the occupied channel, the second gap between an estimated start moment of the current data transmission and an end time of the previous data transmission in the MCOT of the occupied channel can be obtained and marked as $\Delta t_2$.

At step 303, in response to determining that the second gap is smaller than or equal to a second predetermined time length, the occupied channel is still used to perform the current data transmission within the MCOT of the occupied channel.

At step 304, in response to determining that the second gap is greater than the second predetermined time length, channel accessing is performed again for the current data transmission.

For specific implementations of steps 303 and 304, reference can be made to steps 203 and 204, which are not elaborated here.

It should be noted that in the embodiments of the present disclosure, optionally, the second predetermined time length may be a value greater than a default value and bound to the MCOT of the occupied channel. For example, if the default value is 16 us, the second predetermined time length $T_2$ can be set to a value greater than 16 us and positively correlated with the MCOT of the occupied channel. In this case, the larger the MCOT, the larger the value of the second predetermined time length $T_2$. In some examples, the second predetermined time length $T_2$ may be set to a fixed value, for example, 1 ms.

In a possible implementation, the second predetermined time length may be set to a value greater than the default value and positively correlated with the MCOT of the occupied channel. In this case, in response to determining that the second gap is less than or equal to the second predetermined time length, for example, $\Delta t_2 \leq T_2$, the occupied channel can still be used to transmit data within the MCOT of the occupied channel. In response to determining that the second gap is greater than the second predetermined time length, for example $\Delta t_2 > T_2$, channel accessing can be performed again for data transmission.

In another possible implementation, the second predetermined time length may be set to 0.5 ms. In this case, in response to determining that the second gap is smaller than or equal to the second predetermined time length, for example, $\Delta t_2$ is 8 us, the occupied channel can still be used to transmit data within the MCOT of the occupied channel.

In response to determining that the second gap is greater than the second predetermined time length, for example, $\Delta t_2$ is 0.7 ms, channel accessing can be performed again for data transmission.

Further, when the counted time is equal to the MCOT, the following steps S305 to S307 can be performed.

At step 305, in response to a COT for a currently occupied first channel reaching an MCOT of the first channel, the first channel is released.

In the embodiments of the present disclosure, when the MCOT ends, that is to say, in response to the COT for the currently occupied first channel reaching the MCOT of the first channel, the first channel can be released.

At step 306, in response to a data transmission instruction, a first gap between an estimated start moment of a data transmission and a release moment for the first channel is obtained.

The first gap can refer to a gap between two adjacent transmissions.

For example, in response to the data transmission instruction, the first gap between the estimated start moment of the data transmission and the release moment for the first channel can be obtained and marked as $\Delta t_1$.

At step 307, in response to the first gap reaching a first predetermined time length, a second channel is occupied for the data transmission.

In the embodiments of the present disclosure, when the MCOT ends, it can be ensured that the first gap between two adjacent transmissions reaches the first predetermined time length, such that the second channel can be occupied for data transmission.

The first predetermined time length can be set according to actual needs. For example, the first predetermined time length $T_1$ may be set as a value bound to the MCOT of the first channel, or the first predetermined time length $T_1$ may be set as a fixed value.

In the data transmission methods provided by the present disclosure, for a no-LBT channel access scene over an unlicensed frequency band, optionally, when the MCOT is not ended, the second gap between the current data transmission and the previous data transmission (which are both within the MCOT of the occupied channel) can be obtained, and a matched channel occupancy strategy can be determined according to the second gap. In this way, the transmitter using the no-LBT mechanism is prevented from starting the next transmission immediately and occupying the channel continuously. In some examples, when the MCOT is ended, the first gap between the estimated start moment of a data transmission and the release moment for the first channel can be obtained, and a matched channel occupancy strategy can be determined according to the first gap. As such, a problem of a transmitter almost continuously occupying a channel can be alleviated, which ensures not bringing continuous interference and other effects to other neighboring nodes, and improves the quality of data transmission as well as the reliability and effectiveness of the data transmission process.

Figure 4:
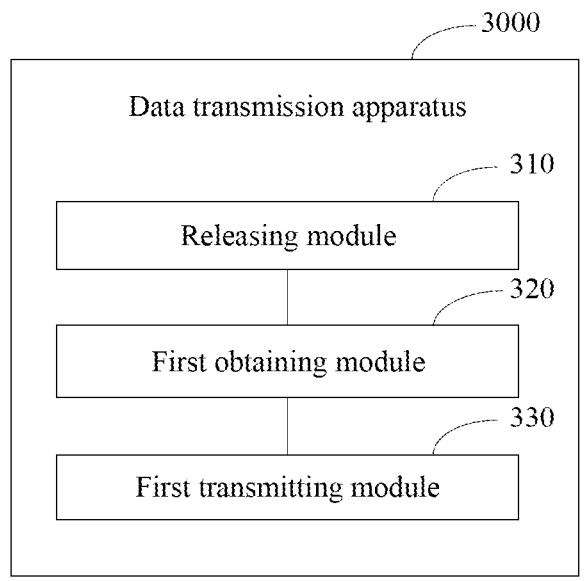
FIG. 4 is a structural schematic diagram of a data transmission apparatus provided by the embodiments of the present disclosure.
Figure 5:
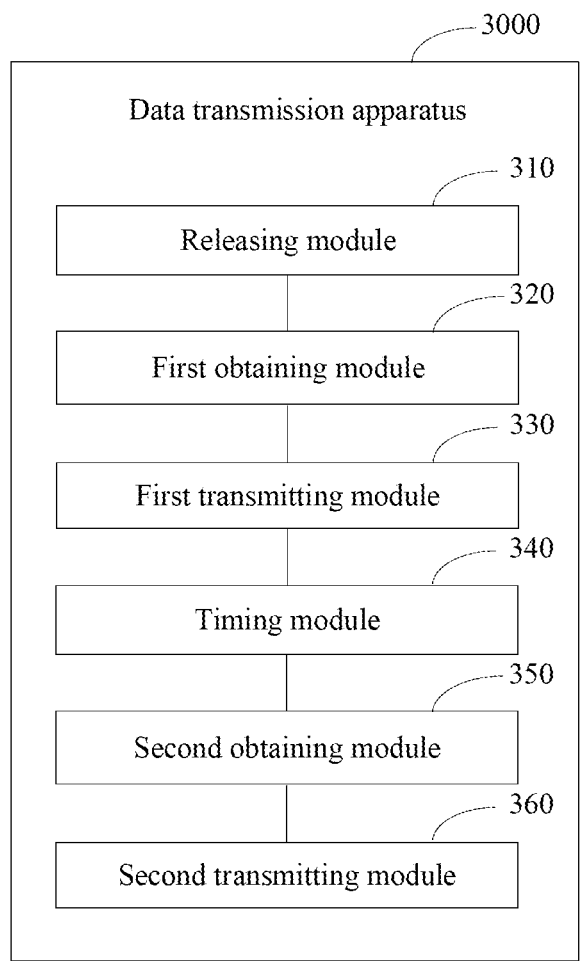
FIG. 5 is a structural schematic diagram of another data transmission apparatus provided by the embodiments of the present disclosure.

Corresponding to the data transmission methods provided by the above-mentioned several embodiments, the present disclosure further provides a data transmission apparatus. Since the data transmission apparatus provided by the embodiments of the present disclosure correspond to the data transmission methods provided by the above-mentioned several embodiments, implementations of the data transmission methods are also applicable to the data transmission apparatus provided in the present embodiment, which will not be described in detail in the present embodiment. FIG. 4 and FIG. 5 are structural schematic diagrams of data transmission apparatuses provided according to the present disclosure.

As shown in FIG. 4, the data transmission apparatus 3000 can be applicable to a no-Listen-Before-Talk (no-LBT) channel access scene over an unlicensed frequency band. The data transmission apparatus may include a releasing module 310, a first obtaining module 320 and a first transmitting module 330.

The releasing module 310 is configured to release a first channel in response to a Channel Occupy Time (COT) for a currently occupied first channel reaching a Maximum Channel Occupy Time (MCOT) of the first channel.

The first obtaining module 320 is configured to obtain, in response to a data transmission instruction, a first gap between an estimated start moment of a data transmission and a release moment for the first channel.

The first transmitting module 330 is configured to occupy, in response to the first gap reaching a first predetermined time length, a second channel for the data transmission.

In the embodiments of the present disclosure, the releasing module 310 is further configured to:
not initiate the data transmission in response to that the first gap not reaching the first predetermined time length.

In the embodiments of the present disclosure, the first predetermined time length is positively correlated with the MCOT of the first channel; or the first predetermined time length includes a fixed value.

In the embodiments of the present disclosure, as shown in FIG. 5, the data transmission apparatus 3000 may further include:
a timing module 340, configured to obtain, for the occupied first channel or the occupied second channel, a COT for the occupied channel by counting from an occupy moment for the occupied channel;
a second obtaining module 350, configured to obtain, in response to the COT not reaching an MCOT of the occupied channel and at least one data transmission having been completed in the MCOT, a second gap between a current data transmission to be performed and a previous completed data transmission within the MCOT of the occupied channel; and
a second transmitting module 360, configured to perform the current data transmission in the occupied channel within the MCOT of the occupied channel in response to the second gap being smaller than or equal to a second predetermined time length.

In the embodiments of the present disclosure, the second transmitting module 360 is further configured to:
perform channel accessing again for the current data transmission in response to the second gap being greater than the second predetermined time length.

In the embodiments of the present disclosure, the second predetermined time length includes a fixed value greater than a default value; or the second predetermined time length is greater than the default value and is positively correlated with the MCOT of the occupied channel.

In the data transmission apparatus provided by the present disclosure, for a no-LBT channel access scene over an unlicensed frequency band, optionally, when the MCOT is not ended, the second gap between the current data transmission and the previous data transmission (which are both within the MCOT of the occupied channel) can be obtained, and a matched channel occupancy strategy can be determined according to the second gap. In this way, the transmitter using the no-LBT mechanism is prevented from starting the next transmission immediately and occupying the channel continuously. In some examples, when the MCOT is ended, the first gap between the estimated start moment of a data transmission and the release moment for the first channel can be obtained, and a matched channel occupancy strategy can be determined according to the first gap. As such, a problem of a transmitter almost continuously occupying a channel can be alleviated, which ensures not bringing continuous interference and other effects to other neighboring nodes, and improves the quality of data transmission as well as the reliability and effectiveness of the data transmission process.

In the embodiments of the present disclosure, the present disclosure further provides an electronic device and a readable storage medium.

Figure 6:
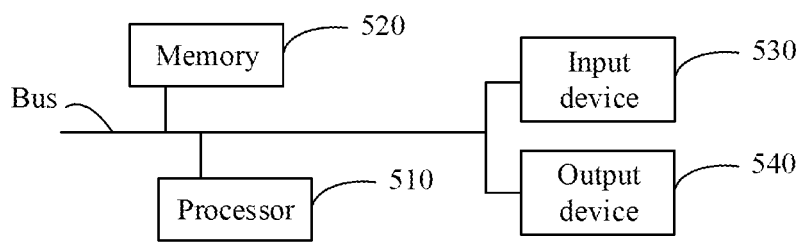
FIG. 6 a structural schematic diagram of an electronic device provided in the embodiments of the present disclosure.

As shown in FIG. 6, which is a block diagram of an electronic device for data transmission according to an embodiment of the present disclosure. The electronic device may be intended to represent various forms of digital computers, such as laptops, desktops, workstations, personal digital assistants, servers, blade servers, mainframes, and other suitable computers. The electronic device may also represent various forms of mobile devices, such as personal digital assistants, cellular telephones, smart phones, wearable devices, and other similar computing devices. The components shown herein, their connections and relationships, and their functions, are by way of examples only, and are not intended to limit implementations of the disclosure described and/or claimed herein.

As shown in FIG. 6, the electronic device can include one or more processors 510, one or more memories 520, and interfaces for connecting various components, including high-speed interfaces and low-speed interfaces. The various components are interconnected using different buses and can be mounted on a common motherboard or otherwise as desired. The processors can process instructions executed within the electronic device, including instructions stored in or on the memories to display graphical information of GUI on an external input/output device (for example, a display device coupled to an interface). In other implementations, multiple processors and/or multiple buses may be used with multiple memories, if needed. Likewise, multiple electronic devices may be connected, with each device providing some of necessary operations (e.g., as a server array, a set of blade servers, or a multi-processor system). One processor 510 is taken as an example in FIG. 6.

Memory 520 can be a non-transitory computer-readable storage medium provided in the present disclosure. The memory stores instructions executable by at least one processor, so that the at least one processor executes the data transmission methods provided by the present disclosure. The non-transitory computer-readable storage medium in the present disclosure stores computer instructions, and the computer instructions are used to cause a computer to execute the data transmission methods provided by the present disclosure.

As a non-transitory computer-readable storage medium, memory 520 can be used to store non-transitory software programs, non-transitory computer-executable programs, and modules, such as the program instructions/modules (for example, the releasing module 310, the first obtaining module 320 and the first transmitting module 330 shown in FIG. 4) corresponding to the data transmission methods in the embodiments of the present disclosure. Processor 510 executes various functional applications and data processing of a server by running the non-transitory software programs, instructions and modules stored in memory 520, that is, implements the data transmission methods in the above-mentioned method embodiments.

Memory 520 may include a program storage area and a data storage area, where the program storage area can store an operating system and an application program needed by at least one function, and the data storage area can store data created based on the usage of the electronic device. In addition, memory 520 may include a high-speed random access memory, and may also include a non-transitory memory, such as at least one magnetic disk storage device, a flash memory device, or other non-transitory solid-state storage devices. In some examples, memory 520 may include storages that are set remotely relative to processor 510, and these remote storages may be connected to the electronic device through a network. Examples of the above-mentioned network can include, but is not limited to, the Internet, enterprise intranet, local area network, mobile communication network, and a combination thereof.

The electronic device for data transmission may further include: an input device 530 and an output device 540. The processor 510, the memory 520, the input device 530, and the output device 540 may be connected through a bus or in other ways, and an example of being connected through a bus is shown in FIG. 6.

The input device 530 can receive input numbers or character information, and generate key signal input related to user settings and function control of the electronic device. The input device 530 may include, for example, a touch screen, a keypad, a mouse, a trackpad, a touchpad, a pointing stick, one or more mouse buttons, a trackball, a controller stick and the like. The output device 540 may include a display device, an auxiliary lighting device (e.g., LED), a tactile feedback device (e.g., a vibration motor), and the like. The display device may include, but is not limited to, a liquid crystal display (LCD), a light emitting diode (LED) display, and a plasma display. In some implementations, the display device may be a touch screen.

Various implementations of the systems and techniques described herein can be implemented in digital electronic circuit systems, integrated circuit systems, Application Specific Integrated Circuits (ASICs), computer hardware, firmware, software, and/or combinations thereof. These various implementations may include being implemented in one or more computer programs executable and/or interpreted on a programmable system including at least one programmable processor. The programmable processor can be special-purpose or general-purpose programmable processor, can receive data and instructions from a storage system, at least one input device, and at least one output device, and can transmit data and instructions to the storage system, the at least one input device and the at least one output device.

These computer programs (also referred to as programs, software, software applications, or codes) can include machine instructions for a programmable processor and can be implemented with high-level procedural and/or object-oriented programming languages, and/or assembly/machine language. As used herein, the terms "machine-readable medium" and "computer-readable medium" refer to any computer program product, apparatus and/or device (for example, magnetic disks, optical disks, memories, Programmable Logic Devices (PLDs) for providing machine instructions and/or data to the programmable processor, including a machine-readable media that receives machine instructions as machine-readable signals. The term "machine-readable signal" refers to any signal used to provide machine instructions and/or data to the programmable processor.

To provide interaction with a user, the systems and techniques described herein can be implemented on a computer having a display device (e.g., a Cathode Ray Tube (CRT) or LCD monitor) for displaying information to the user, and a keyboard and pointing device (e.g., a mouse or a trackball) by which the user can provide input to the computer. Other kinds of devices may also be used to provide interaction with the user. For example, feedback provided to the user may be any form of sensory feedback (e.g., visual feedback, auditory feedback, or tactile feedback), and the input from the user can be received in any form (including acoustic input, voice input, or tactile input).

The systems and techniques described herein can be implemented on a computing system that includes backend components (e.g., as a data server), or a computing system that includes middleware components (e.g., as an application server), or a computing system that includes front-end components (e.g., a user computer having a graphical user interface or web browser through which a user can interact with embodiments of the systems and techniques described herein), or a computing system that includes any combination of such backend components, middleware components, and front-end components. The components of the systems can be interconnected through any form or medium of digital data communication (e.g., a communication network). Examples of the communication network can include Local Area Network (LAN), Wide Area Network (WAN), and the Internet.

A computer system may include a client and a server. The client and the server are usually remote from each other and generally interact through a communication network. A correlation between the client and the server is generated by running a computer program that has a client-server relationship on corresponding computers separately.

In the data transmission methods provided by the present disclosure, for a no-LBT channel access scene over an unlicensed frequency band, optionally, when the MCOT is not ended, the second gap between the current data transmission and the previous data transmission (which are both within the MCOT of the occupied channel) can be obtained, and a matched channel occupancy strategy can be determined according to the second gap. In this way, the transmitter using the no-LBT mechanism is prevented from starting the next transmission immediately and occupying the channel continuously. In some examples, when the MCOT is ended, the first gap between an estimated start moment of a data transmission and a release moment for the first channel can be obtained, and a matched channel occupancy strategy can be determined according to the first gap. As such, a problem of a transmitter almost continuously occupying a channel can be alleviated, which ensures not bringing continuous interference and other effects to other neighboring nodes, and improves the quality of data transmission as well as the reliability and effectiveness of the data transmission process.

Embodiments of the present disclosure provide a data transmission method, apparatus, and an electronic device. For a no-LBT channel access scene over an unlicensed frequency band, a first channel can be released in response to a Channel Occupy Time (COT) for a currently occupied first channel reaching an MCOT of the first channel, a first gap between an estimated start moment of a data transmission and a release moment for the first channel can be obtained in response to a data transmission instruction, and a second channel can be occupied for the data transmission in response to the first gap reaching a first predetermined time length. In this way, a problem of a transmitter almost continuously occupying a channel can be alleviated, which ensures not causing continuous interference and other effects on other neighboring nodes, thereby improving the quality of data transmission as well as the reliability and effectiveness of the data transmission process.

It should be understood that, in the various forms of processes described above, steps may be reordered, added, or removed. For example, steps described in the present application may be executed in parallel, sequentially, or in a different order, as long as a desired result of the technical solution disclosed in the present disclosure can be realized, which is not limited herein.

The above specific implementations do not constitute a limitation on the protection scope of the present disclosure. It should be apparent to those skilled in the art that various modifications, combinations, sub-combinations and substitutions may be made depending on design needs and other factors. Any modifications, equivalent replacements and improvements made within the spirit and principles of the present disclosure shall be included within the protection scope of the present disclosure.

The invention claimed is:

1. A data transmission method, being applicable in a no-Listen-Before-Talk (no-LBT) channel access scene over an unlicensed frequency band, the method comprising:
    releasing a first channel in response to a Channel Occupy Time (COT) for a currently occupied first channel reaching a Maximum Channel Occupy Time (MCOT) of the first channel;
    obtaining, in response to a data transmission instruction, a first gap between an estimated start moment of a data transmission and a release moment for the first channel; and
    occupying, in response to the first gap reaching a first predetermined time length, a second channel for the data transmission.

2. The data transmission method according to claim 1, further comprising:
    not initiating the data transmission in response to that the first gap not reaching the first predetermined time length.

3. The data transmission method according to claim 1, wherein
    the first predetermined time length is positively correlated with the MCOT of the first channel.

4. The data transmission method according to claim 1, wherein the first predetermined time length comprises a fixed value.

5. The data transmission method according to claim 1, further comprising:
    obtaining, for the occupied first channel or the occupied second channel, a COT for the occupied channel by counting from an occupy moment for the occupied channel:
    obtaining, in response to the COT not reaching an MCOT of the occupied channel and at least one data transmission having been completed in the MCOT, a second gap between a current data transmission to be performed and a previous completed data transmission within the MCOT of the occupied channel; and
    performing the current data transmission in the occupied channel within the MCOT of the occupied channel in response to the second gap being smaller than or equal to a second predetermined time length.

6. The data transmission method according to claim 5, further comprising:
    performing channel accessing again for the current data transmission in response to the second gap being greater than the second predetermined time length.

7. The data transmission method according to claim 5, wherein the second predetermined time length comprises a fixed value greater than a default value.

8. The data transmission method according to claim 5, wherein the second predetermined time length is greater than the default value and is positively correlated with the MCOT of the occupied channel.

9. An electronic device, comprising:
    at least one processor; and
    a memory for storing instructions executable by the at least one processor,
    wherein the at least one processor is configured to:
        release a first channel in response to a Channel Occupy Time (COT) for a currently occupied first channel reaching a Maximum Channel Occupy Time (MCOT) of the first channel;
        obtain, in response to a data transmission instruction, a first gap between an estimated start moment of a data transmission and a release moment for the first channel; and
        occupy, in response to the first gap reaching a first predetermined time length, a second channel for the data transmission.

10. The electronic device according to claim 9, the processor is further configured to:
    not initiate the data transmission in response to that the first gap not reaching the first predetermined time length.

11. The electronic device according to claim 9, wherein the first predetermined time length is positively correlated with the MCOT of the first channel;
    or
    the first predetermined time length comprises a fixed value.

12. The electronic device according to claim 9, the processor is further configured to:
    obtain, for the occupied first channel or the occupied second channel, a COT for the occupied channel by counting from an occupy moment for the occupied channel;
    obtain, in response to the COT not reaching an MCOT of the occupied channel and at least one data transmission having been completed in the MCOT, a second gap between a current data transmission to be performed and a previous completed data transmission within the MCOT of the occupied channel; and
    perform the current data transmission in the occupied channel within the MCOT of the occupied channel in response to the second gap being smaller than or equal to a second predetermined time length.

13. The electronic device according to claim 12, wherein the processor is further configured to:
    perform channel accessing again for the current data transmission in response to the second gap being greater than the second predetermined time length.

14. The electronic device according to claim 12, wherein the second predetermined time length comprises a fixed value greater than a default value;
    or
    the second predetermined time length is greater than the default value and is positively correlated with the MCOT of the occupied channel.

15. A non-transitory computer-readable storage medium storing instructions that, when executed by one or more processors of a device, cause the device to:
- release a first channel in response to a Channel Occupy Time (COT) for a currently occupied first channel reaching a Maximum Channel Occupy Time (MCOT) of the first channel;
- obtain, in response to a data transmission instruction, a first gap between an estimated start moment of a data transmission and a release moment for the first channel; and
- occupy, in response to the first gap reaching a first predetermined time length, a second channel for the data transmission.

16. The non-transitory computer-readable storage medium according to claim 15, wherein the instructions further cause the device to:
- not initiate the data transmission in response to that the first gap not reaching the first predetermined time length.

17. The non-transitory computer-readable storage medium according to claim 15, wherein the first predetermined time length is positively correlated with the MCOT of the first channel;
or
the first predetermined time length comprises a fixed value.

18. The non-transitory computer-readable storage medium according to claim 15, wherein the instructions further cause the device to:
- obtain, for the occupied first channel or the occupied second channel, a COT for the occupied channel by counting from an occupy moment for the occupied channel;
- obtain, in response to the COT not reaching an MCOT of the occupied channel and at least one data transmission having been completed in the MCOT, a second gap between a current data transmission to be performed and a previous completed data transmission within the MCOT of the occupied channel; and
- perform the current data transmission in the occupied channel within the MCOT of the occupied channel in response to the second gap being smaller than or equal to a second predetermined time length.

19. The non-transitory computer-readable storage medium according to claim 18, wherein the instructions further cause the device to:
- perform channel accessing again for the current data transmission in response to the second gap being greater than the second predetermined time length.

20. The non-transitory computer-readable storage medium according to claim 18, wherein the second predetermined time length comprises a fixed value greater than a default value;
or
the second predetermined time length is greater than the default value and is positively correlated with the MCOT of the occupied channel.

* * * * *